May 31, 1966  H. A. BING  3,253,528
PHOTOGRAPHIC CAMERA ACCESSORY

Filed Dec. 18, 1963  2 Sheets-Sheet 1

INVENTOR.
Herbert A. Bing
BY Brown and Mikulka
and
Charles S. McGuire
ATTORNEYS

May 31, 1966     H. A. BING     3,253,528

PHOTOGRAPHIC CAMERA ACCESSORY

Filed Dec. 18, 1963     2 Sheets-Sheet 2

INVENTOR.
Herbert A. Bing
BY Brown and Mikulka
and Charles J. McGuire
ATTORNEYS

United States Patent Office 3,253,528
Patented May 31, 1966

3,253,528
PHOTOGRAPHIC CAMERA ACCESSORY
Herbert A. Bing, Wellesley, Mass., assignor to Polaroid Corporation, Cambridge, Mass., a corporation of Delaware
Filed Dec. 18, 1963, Ser. No. 331,611
4 Claims. (Cl. 95—44)

This invention relates to an adapter or accessory for use in conjunction with a viewfinder and/or rangefinder system of a photographic camera or the like. More specifically, the invention relates to a device which may be used to alter the optical properties of a coupled range-viewfinder, or similar apparatus, when the optical properties of a lens system with which the range-viewfinder is used are altered, as when an auxiliary close-up or portrait lens, for example, is used.

Many photographic cameras are provided with means for viewing a scene or subject to be photographed through optical means other than the objective lens of the camera itself, as in the case of reflex or view-type cameras. One type of viewfinder which is commonly used in combination with a camera includes a fixed frame which indicates to the operator the limits or border of the scene to be photographed. Such viewfinders are typified by the so-called Albada viewfinder which provides a visual image of a fixed frame appearing to the eye of the operator as being projected at some desired distance forwardly of the camera. One of the advantages of this type of viewfinder is that the frame image remains stationary with respect to the scene being viewed regardless of the position of the operator's eye with respect to the viewfinder.

Since the frame size is fixed, certain errors are inherent in the basic Albada system in cameras where the size of the field being photographed is dependent upon the distance from the camera objective lens to such field. Consequently, the field actually defined by the frame image of the viewfinder accurately corresponds to the field included by the camera objective lens at only one particular distance from the camera. This distance is a function of the viewfinder design and is usually established at some point intermediate of the focusing range of the camera lens. If the field being photographed is accurately defined by the viewfinder frame at a distance of, for example, five feet from the camera, the frame will include a somewhat larger area than is actually photographed when the field is substantially less than five feet from the camera, and a smaller area when the field is farther away than five feet. Means may be provided, of course, for varying the size of the viewfinder frame as the camera lens is focused at various distances so that the field defined by the frame corresponds to that included by the camera lens at each distance. Such arrangements add to the cost of the viewfinder, however, and for many cameras a viewfinder having a fixed frame size is adequate even though it is somewhat inaccurate.

The above-mentioned considerations of field size are entirely aside from parallax errors which result from the fact that the optical axis of the viewfinder objective is displaced from that of the camera objective. Provisions may also be made to correct for such errors, such as means for tilting or turning the viewfinder to shift its optical axis in response to focusing movement of the camera lens. Both field size and parallax errors, or means for compensating therefor, in a viewfinder are related to the focal length and focusing range of the objective lens of the camera with which the viewfinder is used. It is a common practice to provide auxiliary lenses which may either replace or be used in conjunction with the normal camera objective lens to change the focal length thereof, as for making portrait, close-ups, telephoto or other such special exposures. When such lenses are used the viewfinder is no longer adapted to permit viewing of the scene to be photographed unless the optical system of the viewfinder is modified in a manner similar to that of the camera objective.

The prior art includes a number of examples of auxiliary adapters which may be used in conjunction with a viewfinder to enable it to be used for viewing a scene to be photographed when the camera objective has been changed or optically modified. Such devices include, for example, optical wedges which shift the optical axis of the viewfinder objective to compensate for the parallax change, and masks which limit the field of view of the viewfinder to correspond to that of the altered camera lens system.

The present invention concerns a device for use with a camera viewfinder which may also include a coupled rangefinder. The physical dimensions of the device are such that it may be attached to the housing for the viewfinder-rangefinder system, thereby positioning auxiliary optical elements in the path of sight of an operator using the system. The device may be installed on and removed from the viewfinder-rangefinder housing easily and quickly, in much the same manner as an auxiliary lens is installed over the camera objective lens.

It is an object of the present invention to provide an adapter for a camera viewfinder, or the like, which appropriately adapts the optical system of the viewfinder for use in conjunction with a camera objective lens of different optical properties than that with which the viewfinder is designed to operate.

Another object is to provide a device for use with a camera viewfinder to modify the optical properties thereof in such a way that when an auxiliary lens is used in conjunction with the camera objective, the resulting change in parallax is compensated for, and also the field size is appropriately magnified to correspond more closely within a fixed frame of the viewfinder to the field actually included by the camera objective as modified.

A further object is to provide an adapter for use with a camera viewfinder when the focal length of the camera objective lens system is modified, the adapter serving to alter the apparent position of an Albada-type frame within the viewfinder.

Still another object is to provide an attachment for a camera viewfinder having an Albada-type projected frame which magnifies the field of view and changes the apparent position of the projected frame while easing the eye accommodation for the new field size and frame position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

In copending U.S. application Serial No. 268,884, filed Mar. 29, 1963, of Herbert A. Bing et al., there is disclosed a range and viewfinder construction for use in conjunction with a photographic camera whereon the device is mounted. The optical elements of the device are coupled for movement in response to focusing movement of the camera objective lens and are contained within a housing which is movable with respect to the camera between folded and erected positions. For purposes of illustration, the adapter device of the present invention is shown in combination with such a camera and coupled range and viewfinder and is physically dimensioned for mounting on the housing of the said range and viewfinder. It will be apparent, however, that the invention is not restricted solely to use with cameras or range and viewfinders having all the features of those shown in the above-referenced application.

Figure 1:
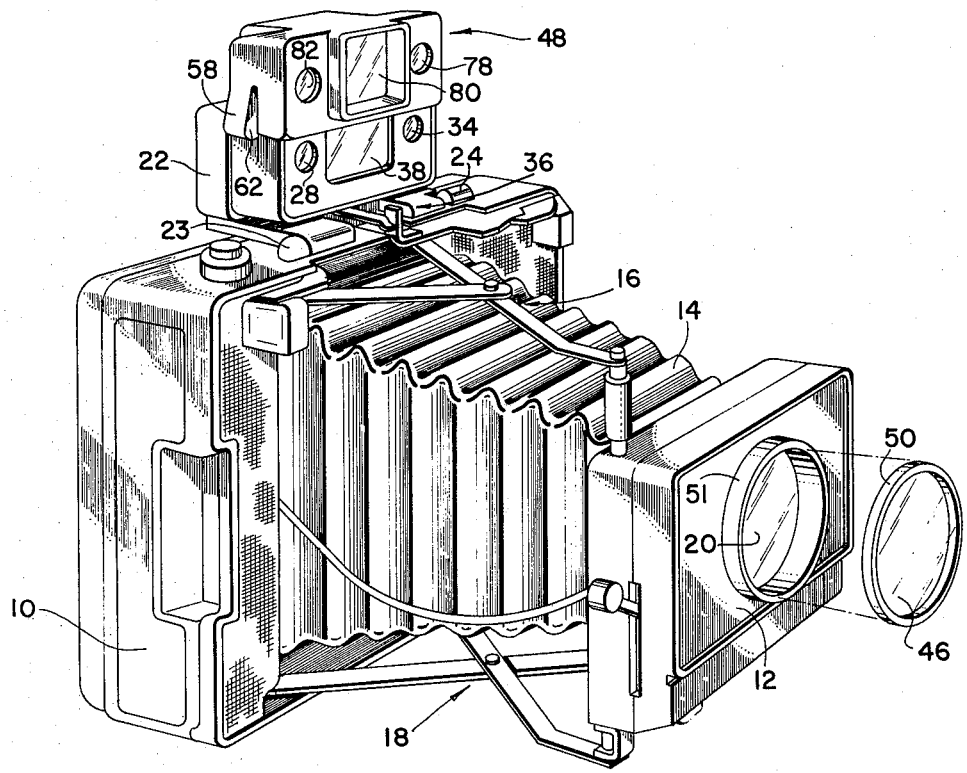
FIGURE 1 is a perspective view of a photographic camera having a coupled range and viewfinder, showing the adapter of the present invention positioned for insertion on the range-viewfinder housing and an auxiliary lens positioned for attachment over the camera objective.

Referring now to the drawings, there is shown in FIGURE 1 a photographic camera having a camera body 10, lens and shutter housing 12, expansible and collapsible bellows 14 and linkages 16 and 18 by means of which housing 12 is supported and may be moved relative to body 10. Objective lens 20 is mounted on housing 12 and is arranged to focus a scene to be photographed at the film plane of the camera within camera body 10. This may be done by moving the pivotal mountings at one side of each of linkages 16 and 18 in a direction transverse to the optical axis of objective lens 20. The structure of the erecting system and the manner of effecting focusing movement of the objective lens through movement thereof in the manner described is disclosed more fully in U.S. application Serial No. 214,560, of Robert S. Borghesani, filed August 3, 1962, now Patent No. 3,185,060.

The optical elements of a combined rangefinder and viewfinder system are contained within housing 22 which is pivotally mounted on hinge pins which extend into hollow portions 23 and 24 on camera body 10. Housing 22 is adapted to be moved about its pivotal mounting between erected and folded positions with respect to camera body 10, and is shown in FIGURE 1 in the erected position. A preferred embodiment of latch means for releasably retaining housing 22 in the erected position may be found in copending application Serial No. 268,917 of Richard R. Wareham, filed Mar. 29, 1963, now Patent No. 3,165,043.

Figure 4:
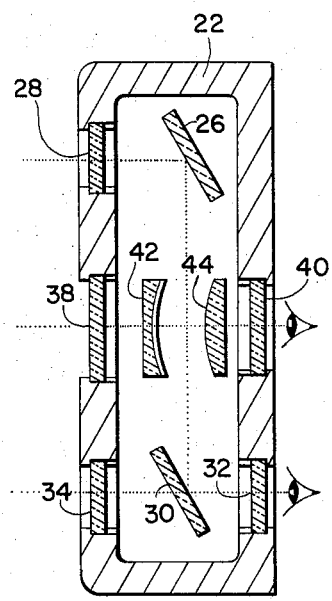
FIG. 4 is a plan view in section of certain elements of the range and viewfinder of the camera of FIGURE 1.

The optical elements of the range and viewfinder and their arrangement within housing 22 are shown diagrammatically in FIG. 4. Mirror 26 is arranged to receive a measuring beam of light from the scene to be photographed through window 28 in the front wall of housing 22. The beam is reflected from mirror 26 to half-silvered mirror 30 and partially reflected thereby through window 32 in the rear wall of housing 22 to the eye of the operator. A direct beam is also received by the eye of the operator through window 34 in the front wall of housing 22. This direct beam is partially transmitted through half-silvered mirror 30 and window 32. Mirror 26 is arranged for rotating movement in response to focusing movement of objective lens 20, whereby the measuring beam reflected by mirror 26 will be in coincidence with the direct beam received through window 34 when the scene from which the beams are received is properly focused at the film plane of the camera. These elements make up a conventional coincidence type rangefinder and details of the construction thereof and the means for coupling mirror 26 to the focusing mechanism for objective lens 20 (indicated generally in FIGURE 1 of the present application by the reference numeral 36) may be found in the aforementioned Bing et al. application.

Means for viewing the scene to be photographed, indicating to the operator the boundaries of the scene focused by lens 20 at the film plane of the camera, are also provided within housing 22. After focusing, the operator may view the scene directly through windows 38 and 40 in the front and rear walls, respectively, of housing 22. View-finder objective 42 and ocular 44 are disposed between windows 38 and 40 within housing 22. Objective 42 is a negative lens and ocular 44 a positive eyepiece in the usual manner of a reversed-Galilean viewfinder which presents a reduced image to the eye of the operator. Also disclosed in the aforementioned Bing et al. application is a construction for transmitting focusing movement of the camera objective lens to the viewfinder objective and ocular for shifting the optical axis thereof to compensate for the parallax arising from the displacement of the optical axes of the camera and viewfinder objectives.

Appropriate means for indicating to an operator viewing the scene to be photographed through the viewfinder the boundaries of the scene which will be recorded on the film may also be provided in a well-known manner. For example, in the Albada viewfinder a frame is painted or otherwise affixed on the surface of the ocular which faces the viewfinder objective. A partly reflecting rear surface on the objective reflects an image of this frame to the eye of the operator. The frame thus appears to be suspended in space at some distance forward of the camera; this distance is a function of the viewfinder construction and is commonly about 80 inches for cameras having an objective lens with a focusing range of from 3½ feet to infinity. Since the frame is fixed in size it will precisely define the boundaries of the scene actually photographed at only one distance from the camera. For purposes of illustration, it will be considered that the frame provided in the viewfinder of FIG. 4 accurately defines the field size at a distance of 5 feet from the camera; consequently, 17% of the field area which is photographed when the camera is focused at infinity will not be included within the fixed frame, and the frame will include a field size which is 10% larger than that actually photographed when the camera is focused at 3½ feet.

Proceeding now with the description of the present invention in combination with the range and viewfinder system described above, in FIGURE 1 is shown an auxiliary lens 46 and the adapter of the present invention, denoted generally by the reference numeral 48. Auxiliary lens 46 is held by an annular ring which includes flange portion 50. Bezel 51 surrounds objective lens 20 and flange 50 may be inserted thereon to position auxiliary lens 46 in covering relation to objective lens 20. The combination of auxiliary lens 46 and objective lens 20 serves to alter the optical properties of the system through which a scene is photographed, as by shortening the focusing distance thereof to permit photographing objects less than 3½ feet from the camera, for example. Such auxiliary lenses are commonly used in combination with the usual objective lens system, or provided as exchangeable objective lenses to permit, for example, portrait for close-up photography. It is evident that the range and viewfinder system of FIG. 4, being calibrated for movement to focus the scene and compensate for parallax in response to focusing of objective lens only, is not suited to perform these functions after the optical system has been modified by the addition of auxiliary lens 46. For example, if objective lens 20 alone is focused on a scene five feet from the camera, the images received from this scene by the direct and measuring beams of the rangefinder will be in superposition and the boundaries of the viewfinder frame will outline the area of this scene which will be recorded on the film. When auxiliary lens 46 is inserted over objective lens 20, however, the taking lens system may now be focused on a scene only two feet from the camera, for example, while the range and viewfinder elements remain as before since no focusing movement of the camera objective has taken place.

Figure 2:
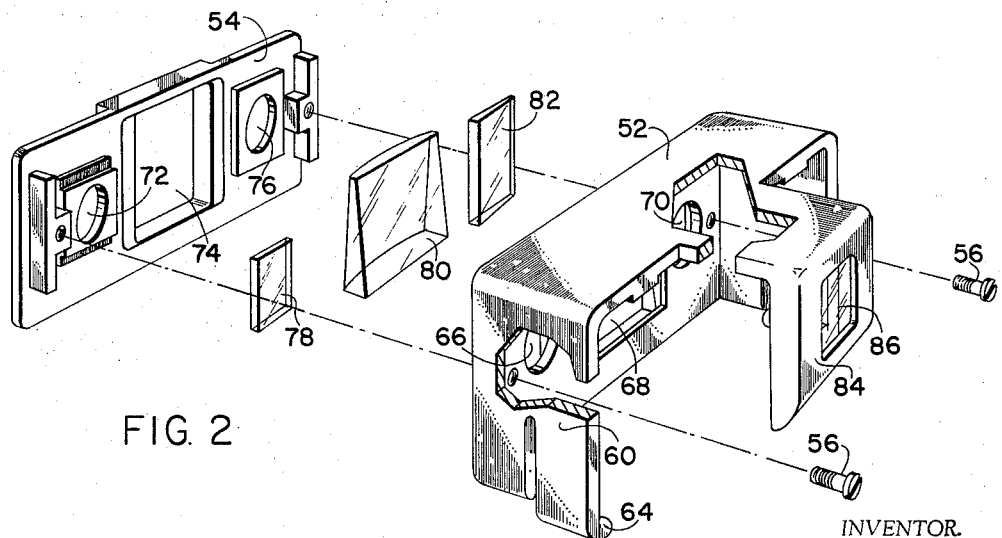
FIG. 2 is an exploded perspective view of the adapter with portions broken away to allow a clearer showing of certain elements.
Figure 3:
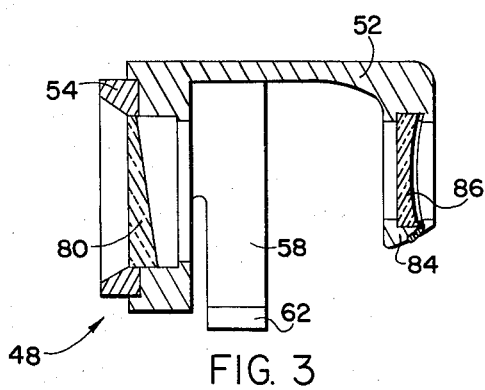
FIG. 3 is a side view in vertical section through the center of the attachment.

Adapter 48 is shown in exploded perspective in FIG. 2 and includes base or support 52 and front plate 54 which is secured to the support by screws 56. The internal dimensions of adapter 48 correspond substantially to the external dimensions of housing 22, whereby the adapter may be mounted over the housing. Support 52 is preferably made of a somewhat resilient material, such as hard rubber or any of a number of well-known plastics, and includes side portions 58 (FIG. 1) and 60 (FIG. 2) which are formed by cutting slots through the side walls from the lower edges thereof towards the top of support 52. Side portions 58 and 60 include, respectively, inward protrusions 62 and 64 which are spaced a shorter distance apart than the width of housing 22. Thus, as adapter 48 is inserted over housing 22, as shown in FIGURE 1, side portions 58 and 60 are resiliently distorted from their normal position by contact of inward protrusions 62 and 64 with the sides of the housing. When the attachment is positioned on the housing, protrusions 62 and 64 are at least partially below the housing and the natural resilience of support 52 causes side members 58 and 60 to move inwardly to their original, undistorted position, thereby securing adapter 48 on housing 22 by engagement of protrusions 62 and 64 under the housing. Adapter 48 may easily be removed since side members 58 and 60 may again be resiliently distorted, as in attachment of the adapter, by lifting upwardly on the adapter.

Support 52 includes openings 66, 68 and 70 in the front wall thereof and front plate 54 includes openings 72, 74 and 76 which are aligned, respectively, with openings 66, 68 and 70 when the front plate is attached to the support by screws 56. Window 78 is engaged by the support and front plate between openings 66 and 72; optical element 80 is similarly engaged between openings 68 and 74, and optical element 82 is positioned between openings 70 and 76. Rear portion 84 extends downwardly from the top wall of support 52 and includes optical element 86, positioned in an opening in the rear portion for alignment with window 40 of the viewfinder system when adapter 48 is positioned on housing 22.

Figure 5:
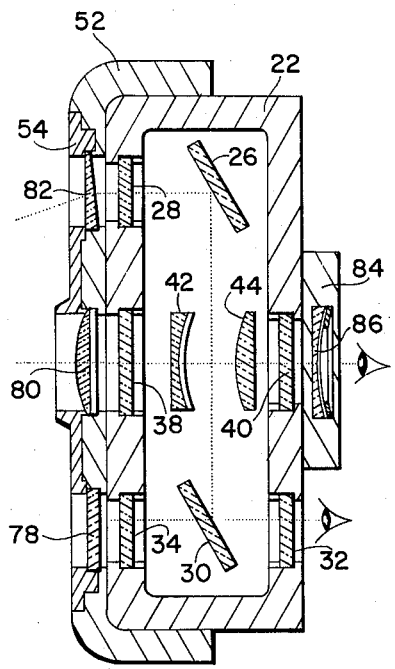
FIG. 5 is a sectional plan view, as in FIG. 4, showing the adapter in position over the range and viewfinder.

With adapter 48 inserted over the range and viewfinder system of the camera, it may be seen from a consideration of FIG. 5 that an operator now views the scene to be photographed through optical elements 80 and 86, in addition to windows 38 and 40, objective 42 and ocular 44. Optical element 80 is a de-centered positive lens, thus serving as both a magnifying lens and an optical wedge. Since the scene is magnified by element 80, the reducing effect of negative viewfinder objective 42 is somewhat offset. This is desirable, however, because the boundaries of the frame as seen through the viewfinder without the adapter will be substantially larger than the boundaries of the field actually recorded on the film when the taking lens system is focused on a scene two feet from the camera. That is, the size of the frame is fixed regardless of the focusing position of the camera lens and accurately defines the field size at only one distance from the camera, as previously mentioned. It was assumed that the viewfinder frame included a field some 10% larger than that focused by the objective lens at the film plane of the camera when focused at 3½ feet. Therefore, when an auxiliary lens is used to bring the focusing distance even closer to the camera the error in the viewfinder frame will be correspondingly increased. By magnifying the field size, or lessening the minifying effect of the viewfinder objective, the apparent field size as defined by the frame corresponds more closely to that actually recorded on the film. The apparent size of the viewfinder frame still remains fixed, but the apparent field size has been increased, thus decreasing or eliminating the discrepancy between the field size defined by the viewfinder frame and that actually recorded on the film. The optical axis of the viewfinder is also shifted by optical element 80 so that it meets the optical axis of the camera taking lens system at the focus distance which results from the use of auxiliary lens 46 rather than the focus distance of objective lens 20 alone. Optical element 80 therefore serves both to correct the apparent field size with respect to the fixed frame and to correct for parallax by shifting the optical axis of the viewfinder.

Optical element 86, positioned between the normal viewfinder ocular 44 and the operator's eye, is a relatively weak negative lens which has the effect of focusing the viewfinder at some distance closer than infinity, which is the normal focusing arrangement for a reversed Galilean viewfinder. The apparent position of the Albada frame is also brought closer to the eye of the operator. For example, if the normal viewfinder elements comprising objective lens 42 and ocular 44 are focused at infinity and the frame appears to be positioned 80 inches in front of the camera, the addition of optical elements 80 and 86 to the viewfinder system in the manner indicated could focus the system on a field at 80 inches and cause the frame to appear at 40 inches. This provides a better compromise for accommodation by the eye of the operator, especially for older people, when the field to be photographed is, for example, on the order of two feet from the camera.

Optical element 82 is an optical wedge which shifts the axis of the measuring beam so that it is received from the scene upon which the taking lens system including auxiliary lens 46 is focused. If the axis of the measuring beam as it is reflected from mirror 26 to mirror 30 were over the nodal point of the camera objective lens, the correction of parallax provided by optical wedge 82 would correct exactly for the new camera objective system and there would be no additional error in the rangefinder system when used to focus the new system. The compensation provided in the illustrated system is adequate, however, for most purposes so that the rangefinder may be operated as usual without objectionable error. If the camera objective system is modified to be focused at very short distances, e.g., one foot or less, it may also be desirable to provide means on adapter 48 for positioning a relatively weak positive lens behind window 32.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic camera having an objective lens system with a first focusing range and an optionally usable, auxiliary lens system, with a second focusing range, the combination comprising:
   (a) a viewfinder system having a negative objective and a positive eyepiece lens focused at infinity;
   (b) means within said viewfinder system defining a fixed frame of the Albada type which appears to an operator viewing through said eyepiece to be projected a first, predetermined distance forwardly of said camera;
   (c) said viewfinder system being so constructed and arranged relative to said camera objective lens system that the optical axes of the two systems cross substantially at the plane focused by said camera objective at the camera film plane throughout said first focusing range, and said fixed frame accurately defines the field of said camera objective at a first, predetermined plane forwardly of said camera;
   (d) a de-centered positive lens;
   (e) a negative lens of weak power relative to said negative objective of said viewfinder system;
   (f) a holder for said de-centered positive and weak negative lenses holding the two in spaced relation;
   (g) means for removably positioning said holder relative to said viewfinder system with said de-centered positive lens forward of said negative objective and said weak negative lens rearwardly of said positive eyepiece lens;

(h) said de-centered positive lens being constructed and arranged to shift the optical axis of said viewfinder system to cross that of said camera objective substantially at the plane focused thereby at said film plane throughout said second focusing range, and to so magnify the field seen through said viewfinder system that said frame accurately defines the field of said camera objective at a second, predetermined plane, closer to said camera than said first plane; and (i) said weak negative lens being constructed and arranged to focus said viewfinder system at a plane closer than infinity and to cause said frame to appear to be projected a second distance, closer than said first distance, forwardly of said camera.

2. The invention according to claim 1 wherein said second, predetermined plane lies within said second focusing range.

3. The invention according to claim 2 wherein said plane closer than infinity, at which said viewfinder system is focused when said holder is positioned thereon, is spaced substantially the same distance forwardly of said camera as said first, predetermined distance.

4. The invention according to claim 3 wherein said viewfinder means are disposed within a housing operatively associated with said camera and said holder is releasably engageable with said housing to position said de-centered positive and weak negative lenses exteriorly thereof in alignment with the viewing axis of said viewfinder system.

References Cited by the Examiner
UNITED STATES PATENTS

| | | | |
|---|---|---|---|
| 2,854,907 | 10/1958 | Tieck | 95—44 |
| 2,936,689 | 5/1960 | Krichhoff | 95—44 |
| 2,961,916 | 11/1960 | Wakimoto | 88—2.4 |
| 2,970,509 | 2/1961 | Barthruff | 352—244 X |

JOHN M. HORAN, *Primary Examiner.*